United States Patent
Ellis et al.

(10) Patent No.: US 6,439,377 B1
(45) Date of Patent: Aug. 27, 2002

(54) TENSION CONTROL APPARATUS AND METHOD FOR AERO-MECHANICAL CONVEYOR

(75) Inventors: Peter J. Ellis, Fordingbridge (GB); David Francis Hesketh, Rock Hill, SC (US)

(73) Assignee: Spiroflow Systems, Inc., Monroe, NC (US)

( * ) Notice: Subject to any disclaimer, the term of this patent is extended or adjusted under 35 U.S.C. 154(b) by 0 days.

(21) Appl. No.: 09/871,175

(22) Filed: May 31, 2001

(30) Foreign Application Priority Data

Mar. 18, 2002 (EP) .......................................... 01 303 023

(51) Int. Cl.[7] .............................................. B65G 23/44
(52) U.S. Cl. ....................................... 198/814; 198/813
(58) Field of Search ................................. 198/813, 814, 198/716, 733

(56) References Cited

U.S. PATENT DOCUMENTS

| | | | | |
|---|---|---|---|---|
| 2,590,183 A | * | 3/1952 | Keesling | 198/813 |
| 2,702,485 A | * | 2/1955 | Nadherny | 198/813 |
| 2,833,394 A | * | 5/1958 | Cordis | 198/813 |
| 2,910,169 A | * | 10/1959 | Russell | 198/814 |
| 3,718,197 A | * | 2/1973 | Barten et al. | 198/814 |
| 4,362,005 A | * | 12/1982 | Hanaway et al. | 198/814 |
| 4,553,664 A | * | 11/1985 | Buschbom et al. | 198/814 |
| 5,651,447 A | * | 7/1997 | Huang | 198/509 |
| 5,704,465 A | * | 1/1998 | Ambs | 198/716 |
| 6,336,550 B1 | * | 1/2002 | Muntener | 198/806 |

* cited by examiner

Primary Examiner—Douglas Hess
(74) Attorney, Agent, or Firm—Adams, Schwartz & Evans, P.A.

(57) ABSTRACT

An improved tension control apparatus for use in an aero-mechanical conveyor for moving bulk materials, the conveyor including upper and lower housings, head and tail pulley assemblies mounted on respective shafts positioned within the upper and lower housings, respectively, spaced-apart inflow and outflow conveyor tubes interconnecting the upper and lower housings, and an endless rope assembly disposed within the conveyor tubes and around the head and tail pulleys. The improvement includes a bracket cooperating with the inflow and outflow conveyor tubes. A guide sleeve is carried by the bracket for receiving a push rod. The push rod extends along the length of the conveyor tubes from the guide sleeve to the upper housing and includes an upper end engaging the head pulley assembly and a lower end extending through the guide sleeve. A tensioning assembly engages the lower end of the push rod and is carried by the bracket for urging the push rod against the head pulley assembly, thereby urging the head pulley assembly away from the tail pulley assembly and maintaining the rope assembly in a tensioned condition.

22 Claims, 10 Drawing Sheets

TENSION CONTROL APPARATUS AND METHOD FOR AERO-MECHANICAL CONVEYOR

TECHNICAL FIELD AND BACKGROUND OF THE INVENTION

This application claims priority of European Patent Application No. 01 303 023.4, filed Mar. 29, 2001. This invention relates to a tension control apparatus and tensioning method for an aero-mechanical conveyor. Aero-mechanical conveyors are often used to convey powders and other particulate matter by entraining the particulate matter in a moving airstream. Such conveyors typically include an endless wire rope assembly upon which dividers are fastened and used for carrying particulate matter. The rope assembly is typically carried on drive and driven pulleys enclosed within infeed, corner and discharge semi-circular housings in various configurations. The housings are interconnected by two tubes through which the rope assembly travels as it moves around the drive and driven pulleys. As the conveyor operates, forces are exerted on the rope assembly that can cause the rope assembly to stretch. Such forces are created by normal wear on the conveyor, the weight of the material being conveyed along the rope assembly, and similar other factors, and can cause the rope assembly to stretch to the point that the amount of tension initially exerted on the rope assembly is inadequate.

While prior art manual tension adjusting mechanisms exist for moving the head and tail pulley assemblies relative to each other to maintain the correct amount of tension on the rope assembly, such mechanisms are often inadequate. For example, some traditional prior art tension adjusting mechanisms rely on clamps which fasten the semi-circular housings to the tubes. Tension on the rope assembly is adjusted by loosening the bolts that hold the clamps in place and sliding one or both of the housings inwardly or outwardly relative to the tubes. Another prior art method of adjusting the tension on the rope assembly involves moving the drive or driven pulley together with the housing. Regardless of which prior art method is employed, adjusting the tension by moving the housings relative to the conveyor tubes is a manual operation. In addition, the discharge end of the equipment is frequently inaccessible, making access to the tube-joining clamps challenging. The clamps nonetheless have to be slackened and re-tightened. Furthermore, once the tension has been adjusted, there is no guarantee that the tubes and the connecting spigots leading to the housings will be properly aligned, which makes jamming almost inevitable.

The invention of the present application overcomes the problems inherent to the prior art described above by providing a tension control apparatus for use on an aero-mechanical conveyor that adjusts tension by moving the housings and pulley assemblies automatically and without requiring any significant manual intervention. The tension control apparatus of the present invention uses compression springs to maintain a pre-selected amount of tension on the rope assembly. One embodiment of the invention also uses cams to ensure that the drive centers cannot be pulled together by an increase in tension on the rope assembly due to the exertion of drive or other forces. The present invention can accommodate a total rope stretch of 16 mm before the tension control apparatus must be reset, and includes a novel reset lever which provides a visual indication of when such a reset is needed. The invention of the present application not only provides a simple procedure for accurately resetting the tension on the rope assembly, but also permits a user to quickly and easily reset the tension to an amount equivalent to that originally set at commissioning, thereby ensuring that an adequate amount of tension is maintained on the rope assembly at all times.

SUMMARY OF THE INVENTION

Therefore, it is an object of the present invention to provide an aero-mechanical conveyor having components which facilitate easy handling and installation, and provide low maintenance operation.

It is another object of the present invention to provide an aero mechanical conveyor that includes a tension control apparatus that provides a visual and repeatable indication of the tensioning force applied to the rope assembly on the conveyor.

It is another object of the present invention to provide an aero-mechanical conveyor that includes sliding seals having a negligible, constant frictional drag, thereby permitting the force being applied to the rope assembly by the tensioning arrangement to be easily determined.

It is another object of the invention to provide an aero mechanical conveyor that includes a tension control apparatus capable of continuous use 365 days each year.

It is another object of the present invention to provide an aero-mechanical conveyor that includes a tension control apparatus which can be used in vertical, angled or horizontal aero-mechanical conveyor systems.

These and other objects of the present invention are achieved in the preferred embodiments disclosed below by providing an improved tension control apparatus for use in an aero-mechanical conveyor for moving bulk materials. The conveyor includes upper and lower housings, and head and tail pulley assemblies mounted on respective shafts positioned within the upper and lower housings, respectively. Spaced-apart inflow and outflow conveyor tubes interconnect the upper and lower housings. An endless rope assembly is disposed within the conveyor tubes and around the head and tail pulley assemblies. The improvement includes a bracket that cooperates with the inflow and outflow conveyor tubes. A guide sleeve is carried by the bracket for receiving a push rod. The push rod extends along the length of the conveyor tubes from the guide sleeve to the upper housing and includes an upper end engaging the head pulley assembly and a lower end extending through the guide sleeve. A tensioning assembly engages the lower end of the push rod and is carried by the bracket for urging the push rod against the head pulley assembly, thereby urging the head pulley assembly away from the tail pulley assembly and maintaining the rope assembly in a tensioned condition.

According to one preferred embodiment of the invention, the bracket is carried on the inflow and outflow conveyor tubes.

According to another preferred embodiment of the invention, the tensioning assembly includes a spring carried thereon urging the tensioning assembly against the push rod for maintaining the rope assembly in the tensioned condition.

According to yet another preferred embodiment of the invention, the tensioning assembly further includes at least one upper plate connected to the bracket and guide sleeve. A lower plate engages the lower end of the push rod. At least one bolt interconnects the upper and lower plates and includes a first end extending through the lower plate; and a second end extending through the upper plate. The second end has a complementary nut releasably attached thereto for being selectively tightened or loosened for urging the upper and lower plates toward or away from each other, thereby respectively increasing or decreasing the tensioned condition of the rope.

According to yet another preferred embodiment of the invention, the spring is concentrically positioned along the length of the bolt and captured between the upper plate and the nut, thereby permitting the spring to contract or expand in response to a respective increase or decrease in the tensioned condition of the rope.

According to yet another preferred embodiment of the invention, the tensioning apparatus includes a cam carried on the push rod. The cam is in abutting engagement with a cam follower carried on the push rod and is positioned for rotation against the cam follower caused by upward movement of the cam follower in response to a decrease in the tensioned condition of the rope assembly, thereby maintaining the rope assembly in a preselected tensioned condition.

According to yet another preferred embodiment of the invention, the improvement further includes first and second dust cap seals interconnecting the inflow and outflow conveyor tubes with the upper housing for reducing emissions of particulate matter from the conveyor.

According to yet another preferred embodiment of the invention, one of the first and second dust cap seals is positioned on a respective one of the inflow and outflow conveyor tubes for permitting sliding, sealing movement of the inflow and outflow conveyor tubes relative to the upper housing, thereby correcting radial misalignment of the tubes relative to the upper housing and reducing friction on the rope assembly.

A method for maintaining a predetermined tension on an endless rope assembly of an aero-mechanical conveyor is provided in which the rope assembly is disposed around head and tail pulleys mounted on respective shafts positioned within upper and lower housings and positioned within spaced-apart inflow and outflow conveyor tubes interconnecting the upper and lower housings. The method include the steps of providing a bracket cooperating with the inflow and outflow conveyor tubes, and providing a guide sleeve carried by the bracket for receiving a push rod. The push rod extends along the length of the conveyor tubes from the guide. sleeve to the upper housing and includes an upper end engaging the head pulley assembly and a lower end extending through the guide sleeve. The method also includes the step of providing a tensioning assembly which engages the lower end of the push rod. The tensioning assembly is carried by the bracket for urging the push rod against the head pulley assembly, thereby moving the head pulley assembly away from the tail pulley assembly and maintaining the rope assembly in the tensioned condition. The head and tail pulley assemblies are positioned at a preselected fixed center distance relative to one another, thereby placing the rope assembly in the predetermined tensioned condition. The tensioning assembly is adjusted within a range of adjustment to compensate for a decrease in the tensioned condition of the rope assembly, thereby adjusting the center distance and the tensioned condition as the tension control apparatus operates.

A method for maintaining a predetermined tension on an endless rope assembly of an aero-mechanical conveyor according to yet another preferred embodiment of the invention is provided in which the tensioning apparatus includes a cam carried on the push rod and in abutting engagement with a cam follower carried on the push rod. The cam is positioned for rotation against the cam follower caused by upward movement of the cam follower in response to a decrease in the tensioned condition of the rope assembly, thereby maintaining the rope assembly in a preselected tensioned condition.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
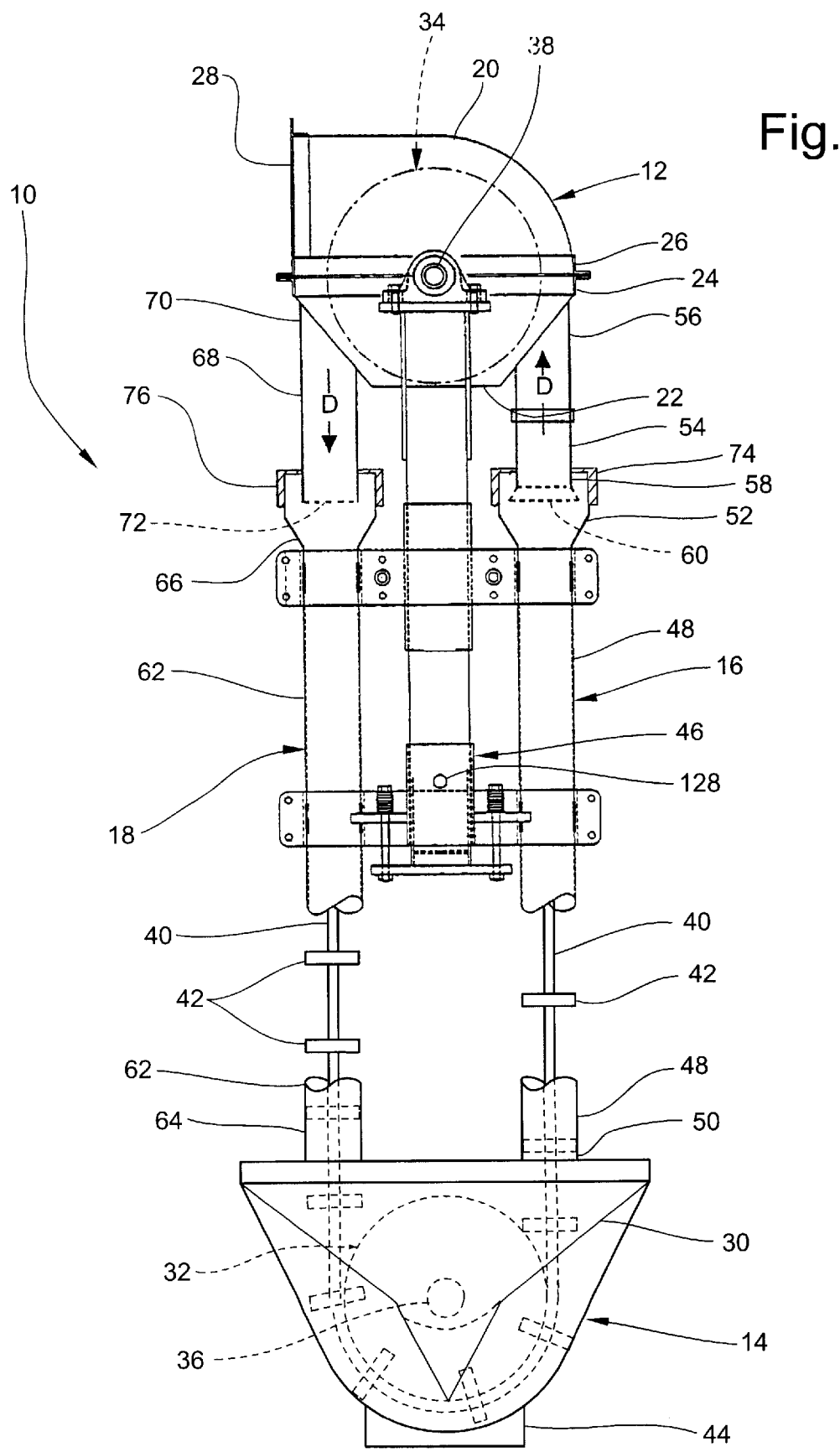
FIG. 1 is a cut-away side elevation of a tension control apparatus according to an embodiment of the present invention shown in use on an aero-mechanical conveyor.

Referring now specifically to the drawings, an aero-mechanical conveyor according to the present invention is illustrated in FIG. 1 and shown generally at reference numeral 10. The conveyor 10 includes an upper housing 12 and an infeed housing 14, which are interconnected by inflow and outflow conveyor tubes 16. and 18, respectively. The upper housing 12 includes a top portion 20 which is removably attached to a bottom portion 22 along first and second angle flanges 24 and 26, respectively. The top portion 20 may be removed for permitting access to the interior of the upper housing 12 for inspection and maintenance, and defines an outlet opening 28 through which particulate matter exits the conveyor 10. The upper housing 12 may optionally include a discharge chute like the discharge chute 160 shown in FIG. 5.

The infeed housing 14 includes an inlet hopper 30 in which particulate matter "P" is stored. Head and tail pulley assemblies 32 and 34 are mounted on respective lower and upper shafts 36 and 38, which are positioned in the infeed housing 14 and upper housing 12, respectively. A continuous rope assembly 40 upon which multiple identical disks 42 are carried is disposed around the head and tail pulley assemblies 32 and 34, and extends through the respective inflow and outflow conveyor tubes 16 and 18. A drive mechanism 44 is positioned adjacent the infeed housing 14 and is operatively connected to the lower shaft 36. The drive mechanism 44 drives the lower shaft 36, causing the head pulley assembly 32 to rotate. This in turn drives the tail pulley assembly 34, and causes the rope assembly 40 to travel in the direction "D" shown. As the rope assembly travels, the disks 42 to carry particulate matter "P" from the inlet hopper 30 through the inflow conveyor tube 16, and into the upper housing 12, where the particulate matter exits the conveyor 10 through the outlet opening 28. Although the drive mechanism 44 is shown in FIG. 1 operatively connected to the lower shaft 36, the drive mechanism 44 may alternatively be operatively connected to the upper shaft 38 (Not shown).

As discussed in detail with reference to FIGS. 2 through 4 below, the conveyor 10 also includes a tensioning assembly 46 which maintains a preselected amount of tension on the rope. assembly 40. While the tensioning assembly 46 is shown in FIG. 1 in use on a vertical aero-mechanical conveyor, the tensioning assembly 46 may alternatively be used on an angled or horizontal conveyor, or on a conveyor having interconnected vertical and horizontal configurations.

Referring again to FIG. 1, inflow conveyor tube 16 includes. an inlet tube 48 having a lower end 50 which is connected to infeed housing 14. The inlet tube 48 also includes a flared upper end 52. A first upper tubular portion 54 interconnects inlet tube 48 with the bottom portion 22 of upper housing 12. Tubular portion 54 has an upper end 56 connected to the bottom portion 22 and a lower end 58 upon which a lead-in flare 60 is positioned. Tubular portion 54 may alternatively be used without the lead-in flare 60 positioned on the lower end 58. Lower end 58 is received within and fluidly communicates with the flared upper end 52 of inlet tube 48. Outflow conveyor tube 18 similarly includes an outlet tube 62 having a lower end 64 and a flared upper end 66. A second upper tubular portion 68 interconnects the outlet tube 62 with the bottom portion 22 of upper housing 12. Second upper tubular portion 68 has an upper end 70 which is connect to the bottom portion 22, and a lower end 72 which is received within and fluidly communicates with the flared upper end 66 of outlet tube 62.

Inflow and outflow conveyor tubes 16 and 18 also include first and second flexible dust cap seals 74 and 76, respectively. First dust cap seal 74 covers and encircles flared upper end 52 and lower end 58. Second dust cap seal 74 covers and encircles flared upper end 66 and lower end 72. Dust cap seals 74 and 76 provide a sliding seal between the upper and lower ends 52 and 58, and upper and lower ends 62 and 72, respectively. Each dust cap seal 74 and 76 is a proprietary item and is preferably formed from silicone material approved to FDA 177.2600. Dust cap seals 74 and 76 not only reduce emissions of particulate matter from the conveyor 10, but also allow respective inflow and outflow conveyor tubes 16 and 18 to move relative to the upper housing 12. Permitting movement of the tubes 16 and 18 in this manner corrects radial misalignment of the tubes 16 and 18 relative to the upper housing 12, and reduces friction and subsequent premature wear on the rope assembly 40. While the dust cap seals 74 and 76 are shown in FIG. 1 in use with flared upper ends 52 and 66, respectively, the natural elasticity of the seals 74 and 76 makes them equally suited for use on pipes having solid or rolled ends.

Figure 2:
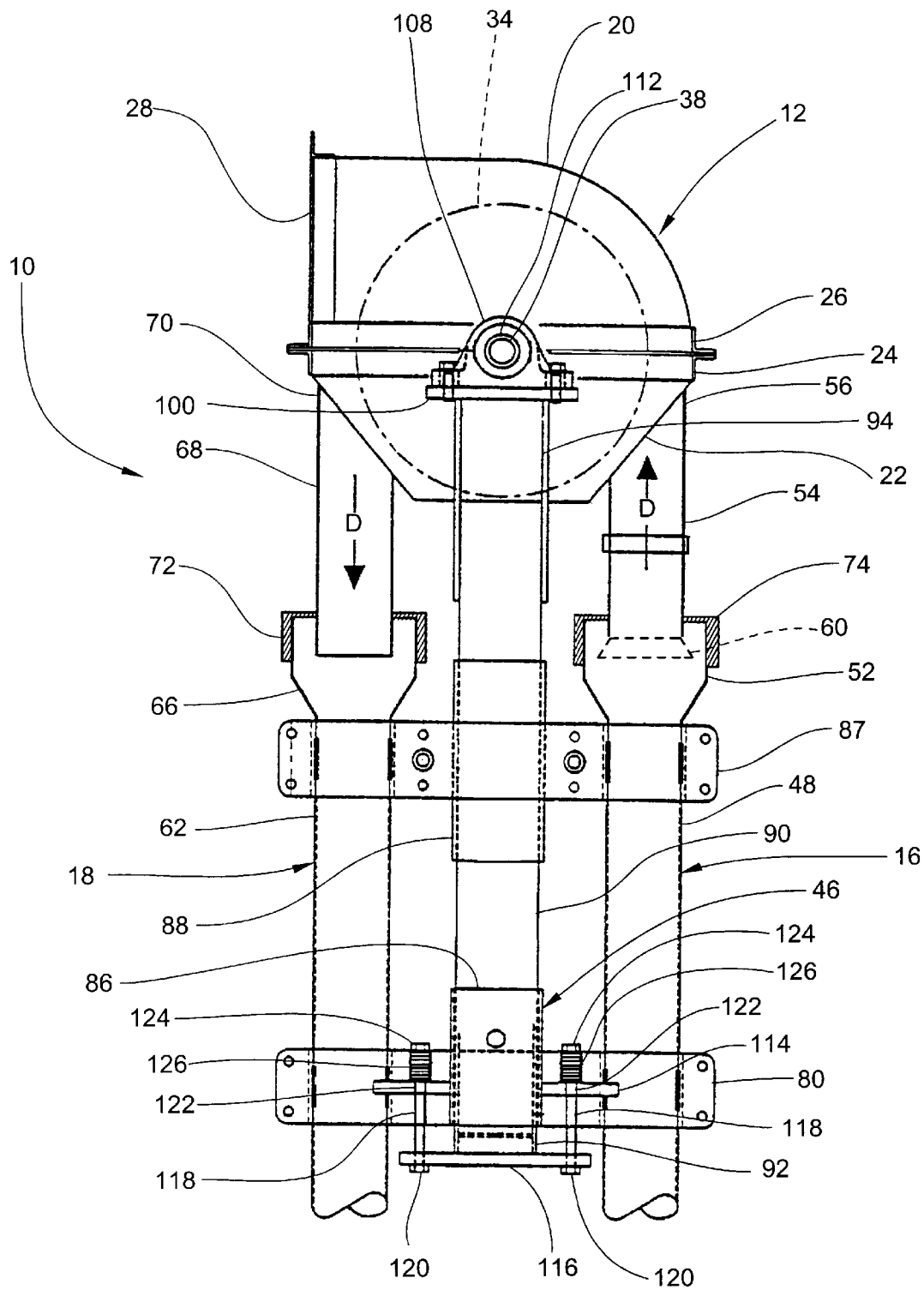
FIG. 2 is a fragmentary side elevation of the tension control apparatus shown in FIG. 1.
Figure 3:
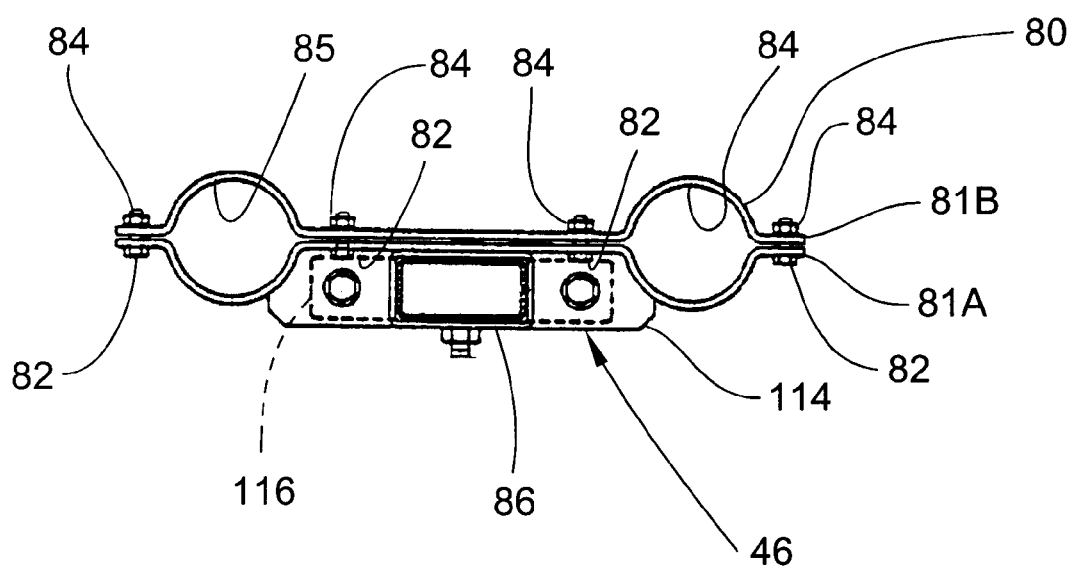
FIG. 3 is a top plan elevation of the tension control apparatus shown in FIG. 1 and removed from the aero-mechanical conveyor.

Referring now to FIG. 2, the manual tensioning assembly 46 is mounted on a tube clamp 80 which is mounted on and extends between inlet tube 48 and outlet tube 62. As is shown in FIG. 3, tube clamp 80 is formed from first and second clamp segments 81A and 81B, respectively, which are connected together by multiple identical bolts 82, upon which complementary nuts 84 are releasably attached. Connected segments 81A and 81B define two openings 84 and 85 through which inlet tube 48 and outlet tube 62, respectively, extend.

Referring again to FIG. 2, a first guide sleeve 86 is mounted on tube clamp 80 and is positioned between inlet tube 48 and outlet tube 62. A second tube clamp 87 is mounted on and extends between the inlet tube 48 and outlet tube 62. Second tube clamp 87 is positioned between the first tube clamp 80 and flared upper ends 52 and 66, respectively. A second guide sleeve 88 is positioned between inlet tube 48 and outlet tube 62 and is in vertical alignment with first guide sleeve 86. An elongate push rod 90 extends through first and second guide sleeves 86 and 88, respectively. Push rod 90 has a lower end 92 that extends through first guide sleeve 86 and an upper end 94 which extends through second guide sleeve 88. Upper end 94 engages a base plate 100 upon which head pulley assembly 34 is mounted. Although the upper end 94 of push rod 90 is shown in FIGS. 1 and 2 engaging the base plate 100, the upper end 94 may alternatively be connected to the upper housing 12. The push rod 90 may also alternatively be connected to the infeed housing 14 for moving the infeed housing 14 relative to the upper housing 12. In an aeromechanical conveyor employing corner housings, one or more push rods 90 may alternatively be connected to one or more corner housings for moving those corner housings relative to other housings included on the conveyor.

Figure 4:
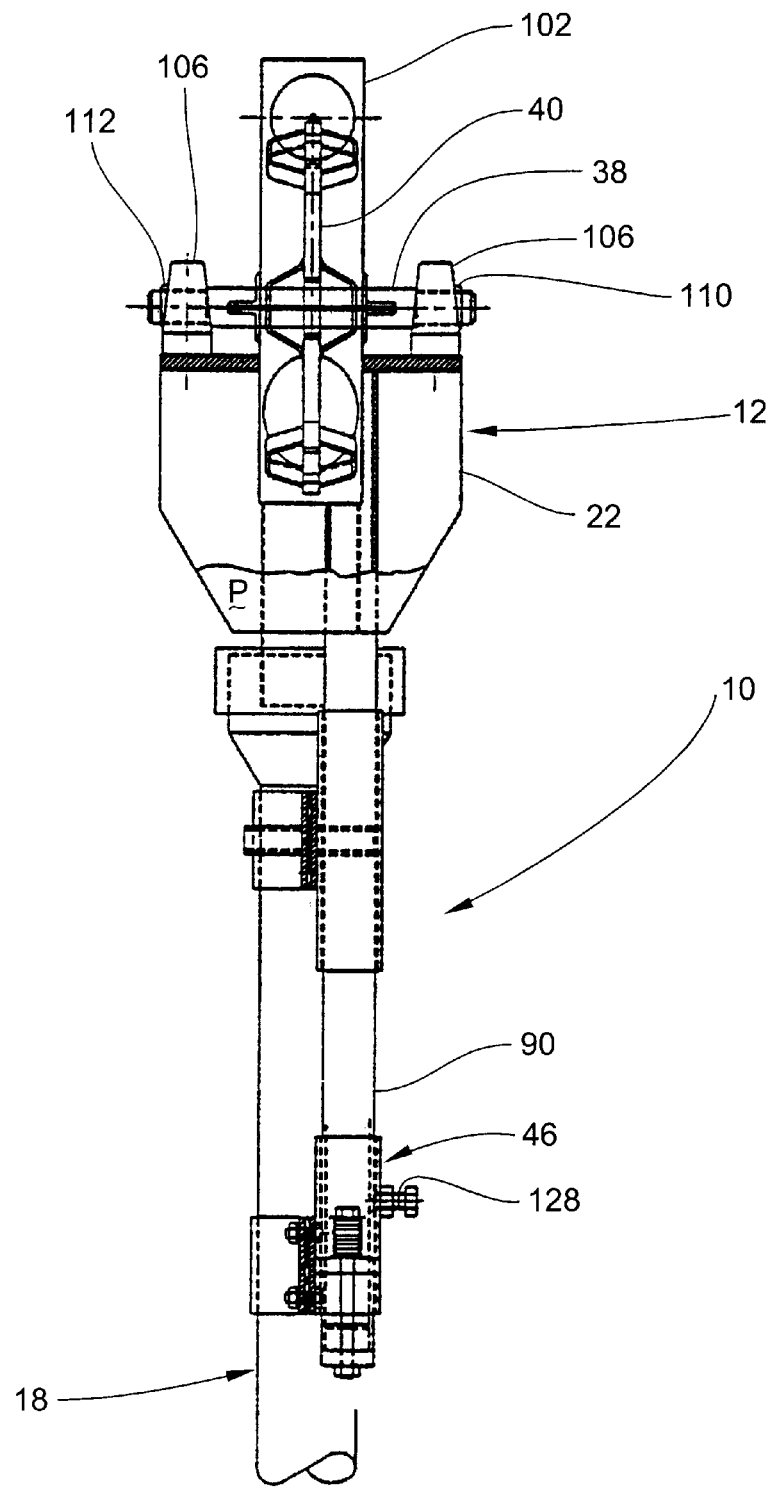
FIG. 4 is a fragmentary side elevation of the tension control apparatus shown in FIG. 1, viewed 90 degrees from the view in FIG. 1.

Referring now to FIG. 4, a sprocket 102 carries the rope assembly 40 and is mounted on upper shaft 38. Upper shaft 38 extends through one side of the upper housing 12 perpendicularly to the plane upon which rope assembly 40 travels. The upper shaft 38 is carried by and extends through bearing housings 106.

Referring again to FIG. 2, the tensioning assembly 46 also includes an upper plate 114 and a pressure plate 116. Upper plate 114 is connected to the tube clamp 80 and guide sleeve 86, and pressure plate 116 engages the lower end 92 of the push rod 90. Upper plate 114 and pressure plate 116 are interconnected by two identical tensioning bolts 118, each of which has a first end 120 that extends through the pressure plate 116 and a second end 122 that extends through the upper plate 114. A respective one of two complementary nuts 124 is releasably attached to the second end 122 of each bolt 118.

The tensioning assembly 46 also includes two springs 126, each of which is positioned concentrically along a respective one of the bolts 118. Each spring 126 is preferably a compression spring, and is captured between the upper plate 114 and a respective one of the nuts 124. While the tensioning assembly 46 is show in use with compression springs, stacks of Belleville washers, gas struts, pneumatic cylinders, or an electrical actuator may alternatively be employed to adjust the tension.

The tensioning assembly 46 is used to maintain a preselected amount of tension on the rope assembly 40 by adjusting the center distance "$C_D$" between the lower and upper shafts 36 and 38. See FIG. 1. To set the desired center distance "$C_D$", each nut 124 is tightened or loosened on its respective bolt 118, which causes the spring positioned on the bolt 118 to contract or expand, respectively. Expansion of the springs 126 creates an increase in the force of the springs 126 on the upper plate 114, and causes the pressure plate 116 to move towards the upper plate 114, which in turn causes upward movement of the push rod 90. Upward movement of the push rod 90 moves the upper housing 12 and the tail pulley assembly 34 away from the head pulley assembly 32, which increases both the center distance "$C_D$" and the tension on the rope assembly 40. In contrast, contraction of the springs 126 causes a decrease in the force of the springs 126 on the upper plate 114, which pulls the pressure plate 116 away from the upper plate 114. The push rod 90 moves downwardly in response, which moves the upper housing 12 and the tail pulley assembly 34 away from the head pulley assembly 32, thereby decreasing not only the center distance "$C_D$", but also the tension on the rope assembly 40.

Once the center distance "$C_D$" is set and the conveyor 10 begins to operate, the increased load on the rope assembly 40 created by the weight of the particulate matter carried on the disks 42 causes the rope assembly 40 to stretch, thereby decreasing the tension on the rope assembly 40.

As is shown in FIG. 1, the tensioning assembly 46 also includes a locking bolt 128, which may be tightened to secure the first guide sleeve 86 to the lower end 92 of the push rod 90. This prevents the guide sleeve 86 from rattling while the conveyor operates. When the guide sleeve 86 is secured to the lower end 92 in this manner, the center distance "$C_D$" will not change during service in response to decreases in tension on the rope assembly 40. A user operating the conveyor 10 must instead slacken the locking bolt 128 at regular maintenance intervals to inspect the springs 126 to determine whether they have moved. If so, the user must reset the springs 126 to their original position.

If the locking bolt 128 is not used, the springs 126 will automatically expand to compensate for the decrease in tension that occurs as the rope assembly 40 stretches. As discussed above, this expansion causes the pressure plate 116 to move upwardly toward the upper plate 114, which in turn causes the push rod 90 to move upwardly, thereby increasing the tension on the rope assembly 40 to compensate for the loss of tension created as the rope assembly 40 stretches.

Although the tensioning assembly 46 effectively compensates for decreases in tension on the rope assembly 40 as the rope assembly 40 stretches, like other conventional "resilient" tensioning devices, the tensioning assembly 46 does not respond effectively to sudden changes in dynamic tension as the conveyor 10 operates. Specifically, during operation of a near-vertical conveyor such as the conveyor 10, the dynamic tension on the rope assembly 40 may be 50% higher than the static tension. The springs 126 respond to this difference by expanding or contracting accordingly, which moves the center distance "$C_D$" away from the optimum. Any instantaneous increase. in load caused, for example, by an obstruction due to snagging or large particle size, can cause an abrupt increase in tension on the rope assembly 40 and prompt an unexpected change in the center distance "$C_D$". Such a sudden change can cause the rope assembly 40 to slacken behind the obstruction enough to get out of pitch and cause a complete jam within the conveyor 10.

Figure 5:
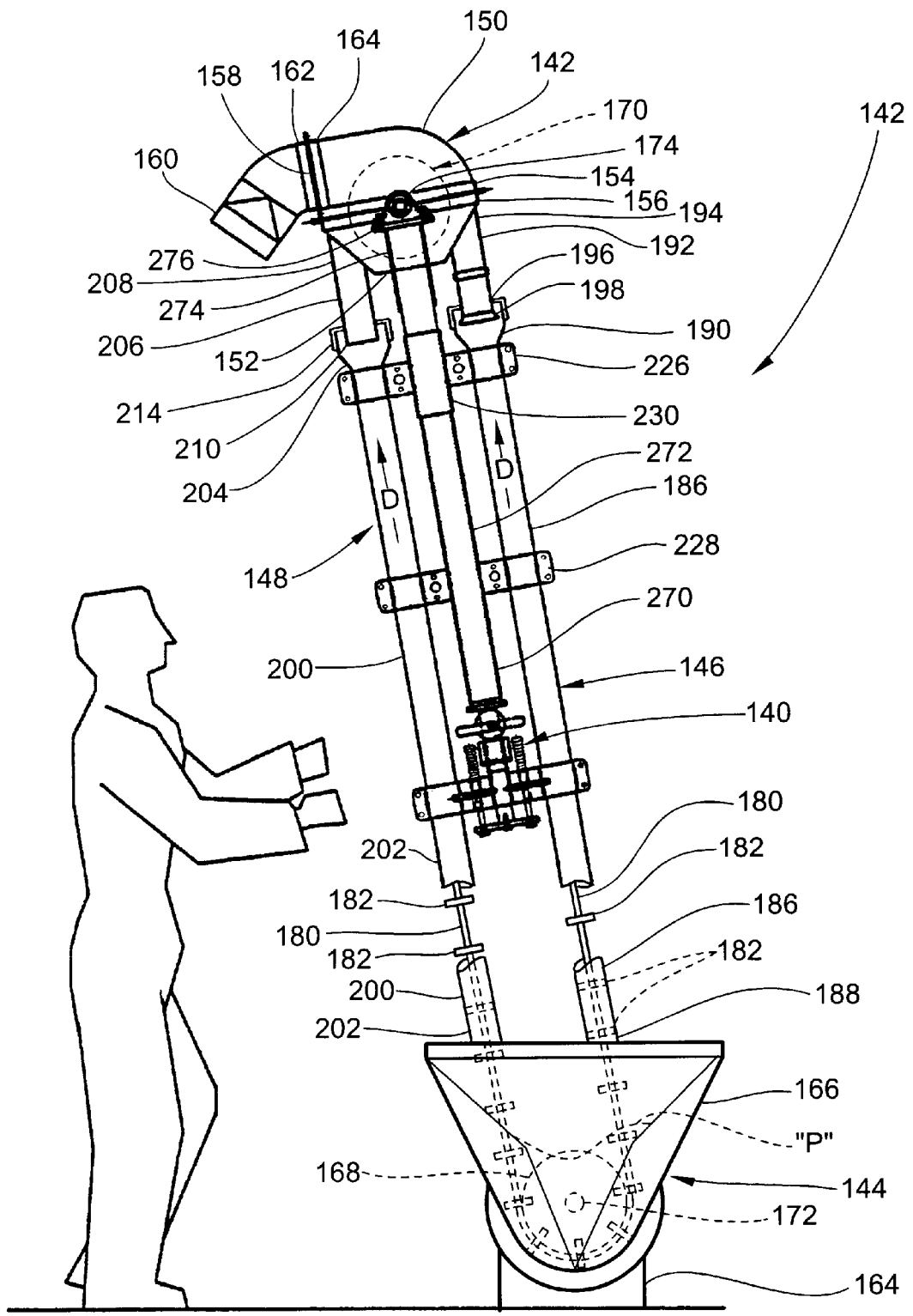
FIG. 5 is an environmental side elevation of a tension control apparatus according to another embodiment of the invention in use on an aero-mechanical conveyor.

Referring now to FIG. 5, an alternative embodiment of an aero-mechanical conveyor according to the present invention is illustrated and shown generally at reference numeral 130. Designed to overcome the problems associated with sudden increases in dynamic tension described above, the conveyor 130 does not rely upon the tensioning assembly 46, but instead utilizes a non-resilient tensioning assembly 140. The conveyor 130 also includes an upper housing 142 and an infeed housing 144, which are interconnected by inflow and outflow conveyor tubes 146 and 148, respectively. The upper housing 142 includes a top portion 150 which is removably attached to a bottom portion 152 along first and second angle flanges 154 and 156, respectively. The top portion 150 may be removed for permitting access to the interior of the upper housing 132 for inspection and maintenance, and defines an outlet opening 158. A discharge chute 160 is removably attached to the top portion 150 adjacent the outlet opening 158 along third and fourth angle flanges 162 and 164, respectively. Discharge chute 160 directs particulate matter passing through the outlet opening 158 away from the conveyor 130. Discharge chute 160 may optionally be removed from the conveyor 130.

The infeed housing 144 includes an inlet hopper 166 in which particulate matter "P" is stored. Head and tail pulley assemblies 168 and 170 are mounted on respective lower and upper shafts 172 and 174, which are positioned in the infeed housing 144 and upper housing 142, respectively. A continuous rope assembly 180 upon which multiple identical disks 182 are carried is disposed around the head and tail pulley assemblies 168 and 170, and extends through the respective inflow and outflow conveyor tubes 146 and 148. A drive mechanism 184 is positioned adjacent the infeed housing 144 and is operatively connected to the lower shaft 172. The drive mechanism 184 drives the lower shaft 172, causing the head pulley assembly 168 to rotate. This in turn drives the tail pulley assembly 170, and causes the rope assembly 180 to travel in the direction "D" shown for permitting the disks 182 to carry particulate matter from the inlet hopper 166 through the inflow conveyor tube 146, into the upper housing 142, and out of the conveyor 130 through the discharge chute 160. The drive mechanism 184 may alternatively be operatively connected to the upper shaft 174 (Not shown).

As is shown in FIG. 5, inflow conveyor tube 146 includes an inlet tube 186 having a lower end 188 which is received within the inlet hopper 166, and a flared upper end 190. A first upper tubular portion 192 interconnects inlet tube 186 with the bottom portion 152 of upper housing 142. Tubular portion 192 has an upper end 194 connected to the bottom portion 152 and a lower end 196 upon which a lead-in flare 198 is positioned. Tubular portion 192 may alternatively be utilized without the lead-in flare 198 on the lower end 196. Lower end 196 is received within and is in fluid communication with the flared upper end 190 of inlet tube 186. Outflow conveyor tube 148 similarly includes an outlet tube 200 having a lower end 202 and a flared upper end 204. A second upper tubular portion 206 interconnects the outlet tube 200 with the bottom portion 152 of upper housing 142. Second upper tubular portion 206 has an upper end 208 which is connected to the bottom portion 152, and a lower end 210 which is received within and fluidly communicates with the flared upper end 204 of outlet tube 200.

Inflow and outflow conveyor tubes 146 and 148 also include first and second flexible dust cap seals 212 and 214, respectively. First dust cap seal 212 covers and encircles flared upper end 190 and lower end 196. Second dust cap seal 214 covers and encircles flared upper end 204 and lower end 210. Dust cap seals 212 and 214 are formed from the same materials and perform the same functions as the dust cap seals 74 and 76 described above and shown in FIG. 1.

Figure 6:
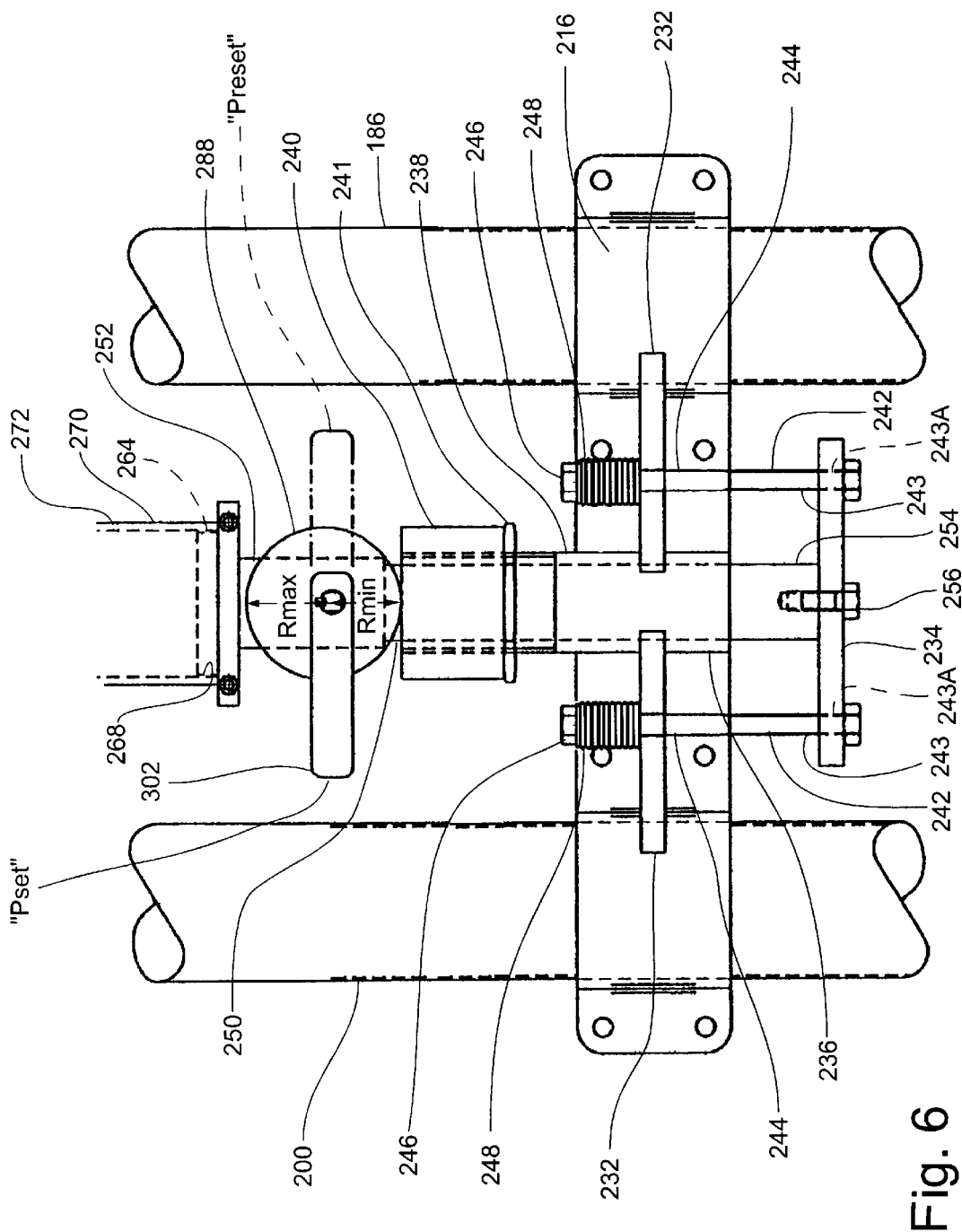
FIG. 6 is a fragmentary side elevation of the tension control apparatus shown in FIG. 5.

Referring now to FIG. 6, the tensioning assembly 140 is mounted on a tube clamp 216. Tube clamp 216 is mounted on and extends between inlet tube 186 and outlet tube 200.

Figure 7:
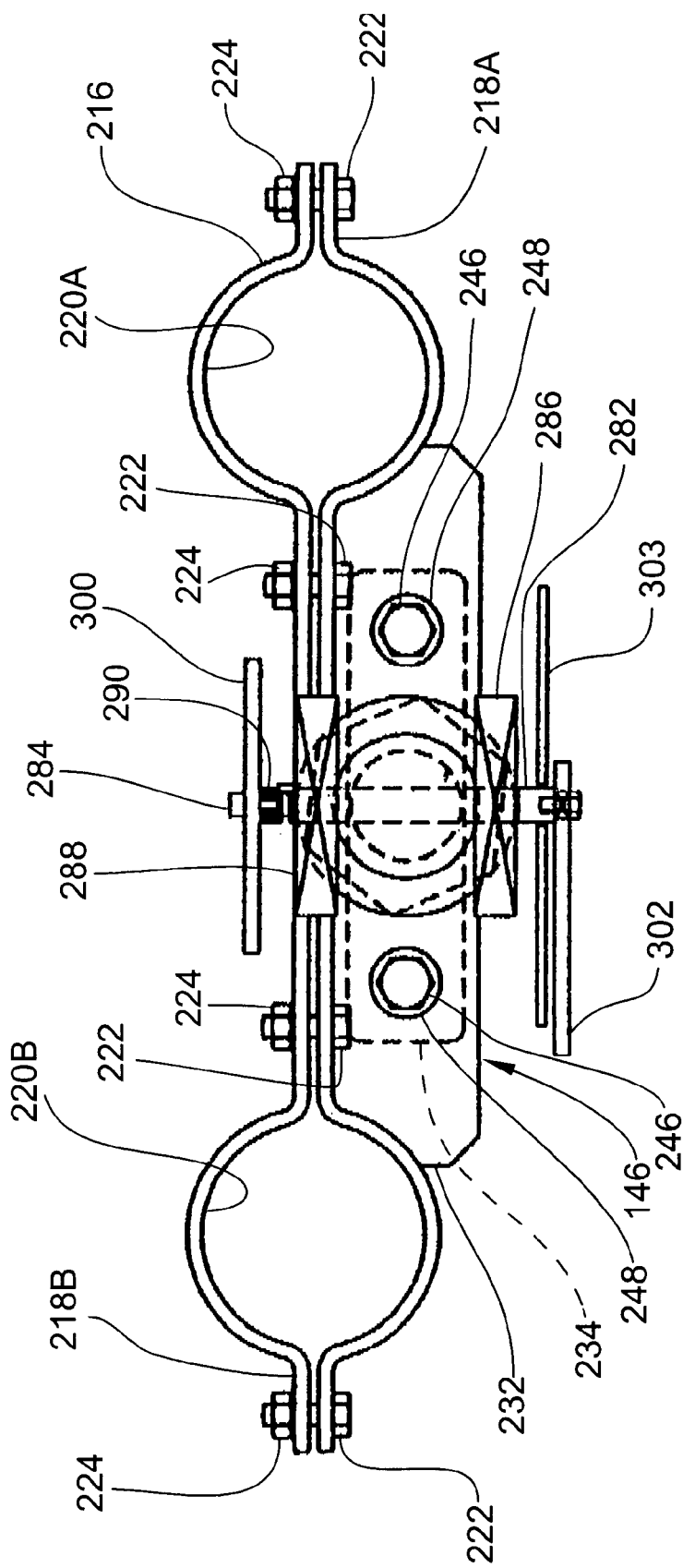
FIG. 7 is a top plan elevation of the tension control apparatus shown in FIG. 6 and removed from the aero mechanical conveyor.

As is shown in FIG. 7, tube clamp 216 includes first and second clamp segments 218A and 218B, respectively, which cooperate with each other to define two openings 220A and 220B through which inlet tube 186 and outlet tube 200, respectively, extend. See FIG. 5. Segments 218A and 218B are connected together by multiple identical bolts 222, upon which complementary nuts 224 are releasably attached.

Referring again to FIG. 5, the conveyor 10 also includes second and third tube clamps 226 and 228, respectively. Each tube clamp 226 and 228 includes the same components and is formed in the same manner as tube clamp 216. The second tube clamp 226 is mounted on and extends between inlet tube 186 and outlet tube 200. The second tube clamp 226 is also positioned adjacent flared upper ends 190 and 204, and has a second guide sleeve 230 mounted thereon. Second guide sleeve 230 is preferably formed from a short length of rectangular or round tube. The third tube clamp 228 is mounted on and extends between inlet tube 186 and outlet tube 200 intermediate the first and second tube clamps 216 and 226, respectively. While the third tube clamp 228 shown in FIG. 5 does not include a guide sleeve, such a sleeve may be installed thereon, if desired. The guide sleeve 230 shown on the second tube clamp 226 is likewise an optional component. Additional tube clamps may be installed which are preferably positioned along the inlet tube 186 and outlet tube 200 eight feet apart from one another. Furthermore, the guide sleeve 230 or any other equivalent guide sleeve mounted on the conveyor 10 may alternatively include a locking bolt identical to the locking bolt 128 shown in FIG. 2. While such a bolt would normally be left slack or removed altogether to allow the tensioning assembly 140 to operate, the bolt would have a role in setting up the assembly 140 for operation.

Figure 8:
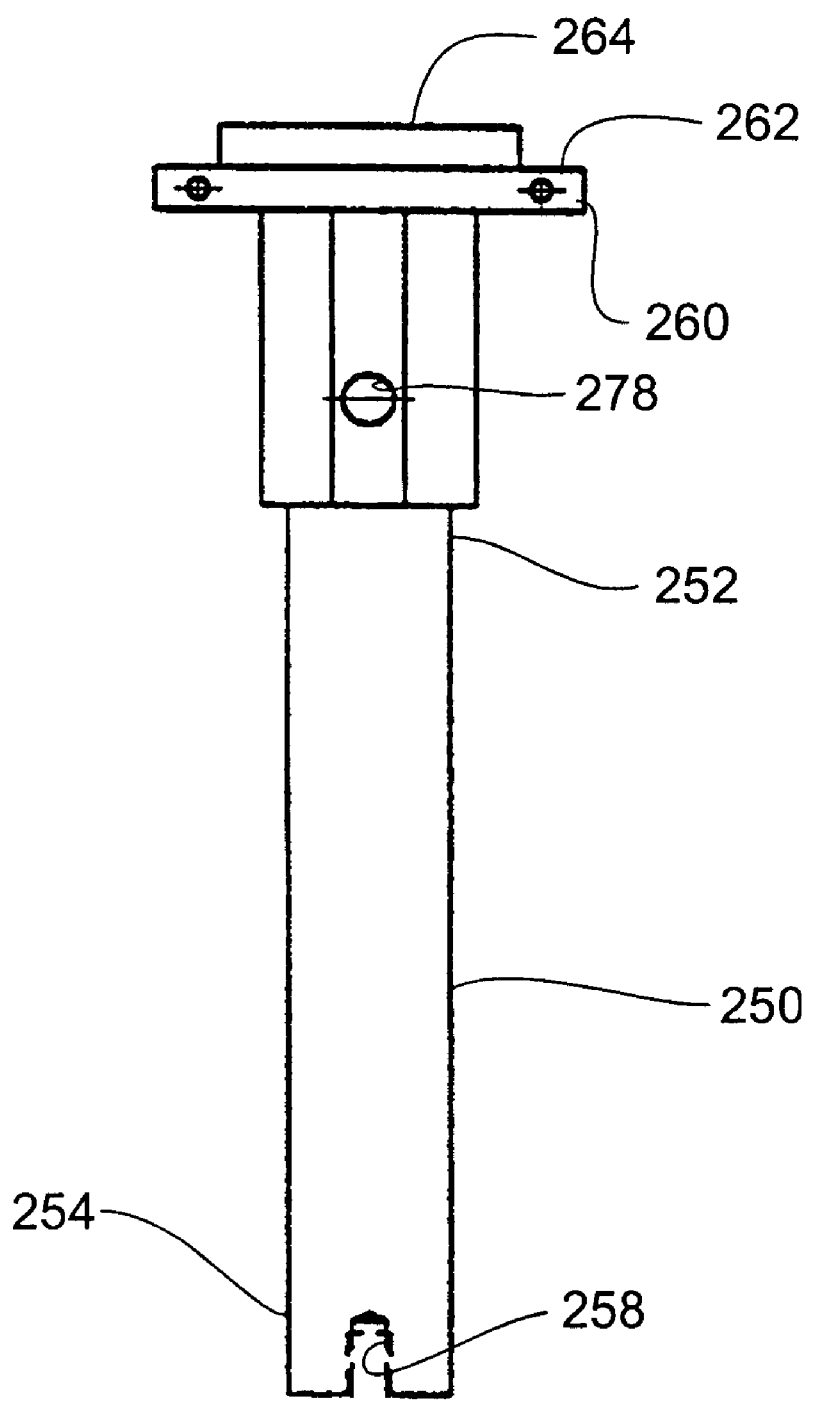
FIG. 8 is an enlarged side elevation of a push rod assembly included in the tension control apparatus shown in FIGS. 5, 6 and 7.

Referring again to FIG. 6, the tensioning assembly 140 includes an upper plate 232 and a pressure plate 234. Upper plate 232 is connected to the tube clamp 216 and a threaded guide tube 236, which is likewise connected to the tube clamp 216. Guide tube 236 is preferably formed from a short length of 1.5" NB tube having an outside diameter of 48.3" and a threaded top end 238. The top end 238 carries a pressure collar 240 and locking nut 241. Upper plate 232 and pressure plate 234 are interconnected by two identical tensioning bolts 242, each of which has a first end 243 that extends through a respective one of two identical holes 243A defined in the pressure plate 234 and a second end 244 that extends through the upper plate 232. A respective one of two complementary nuts 246 is releasably attached to the second end 244 of each bolt 242. The tensioning assembly 140 also includes two springs 248, each of which is positioned concentrically along a respective one of the bolts 242. Each spring 248 is preferably a compression spring, and is captured between the upper plate 232 and a respective one of the nuts 246. While the tensioning assembly 140 illustrated in FIGS. 5, 6, and 8 is shown in use with compression springs, stacks of Belleville washers, gas struts, pneumatic cylinders, or an electrical actuator may alternatively be employed for adjusting the tension.

As is shown in FIG. 6, passing through the guide tube 236 is a first push rod 250 having a top end 252, and a bottom end 254 which is connected to the pressure plate 234 by a bolt 256. As is shown in FIG. 8, a complementary hole 258 is defined in the bottom end 252 of the push rod 250 for receiving the bolt 254 therein. A bore 278 is defined by and extends through the top end 256 of the first push rod 250. A flat plate 260 is welded to the top end 252, and includes an upper surface 262 to which a rectangular pad 264 is attached. As is shown in FIG. 6, the rectangular pad 264 is received within a complementary mouth 268 formed on the lower end 270 of a support post 272. As is shown in FIG. 5, the support post 272 extends between the inflow and outflow conveyor tubes 146 and 148, respectively, and has an upper end 274 that extends through the guide sleeve 230. The upper end 274 engages a base plate 276 upon which the head pulley assembly 170 is mounted. The head pulley assembly 170 is formed from the same components and is constructed in the same manner as the head pulley assembly 34. Although the upper end 274 of push rod 250 is shown in FIG. 5 engaging the base plate 276, the upper end 274 may alternatively be connected directly to the upper housing 142. The push rod 250 may also alternatively be connected to the infeed housing 143 for moving the infeed housing 143 relative to the upper housing 142. In an aeromechanical conveyor employing corner housings, one or more push rods 250 may alternatively be connected to one or more corner housings for moving those corner housings relative to other housings included on the conveyor.

Figure 9:
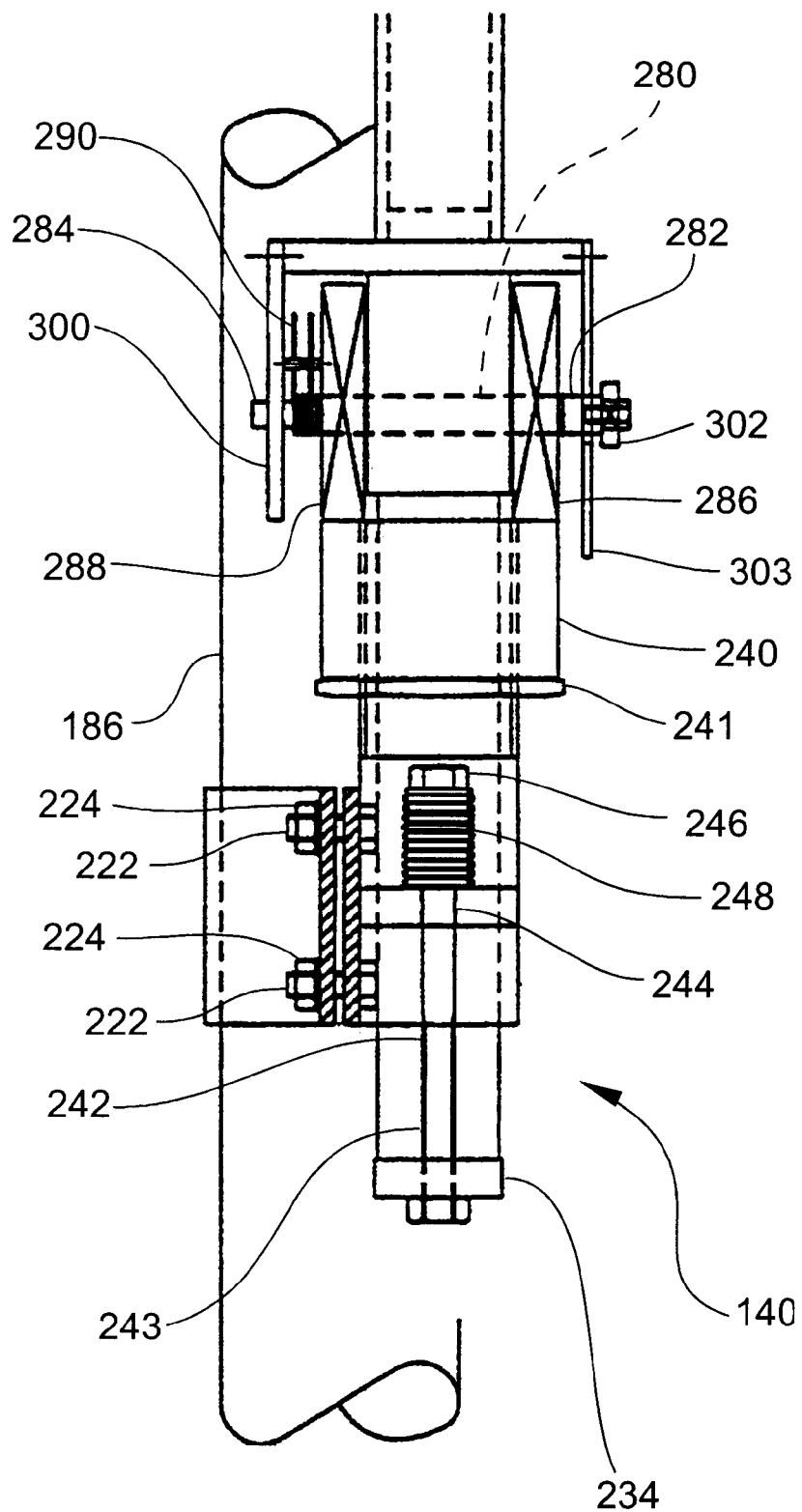
FIG. 9 is a fragmentary side elevation of the tension control apparatus shown in FIG. 6, viewed 90 degrees from the view in FIG. 6.
Figure 10:
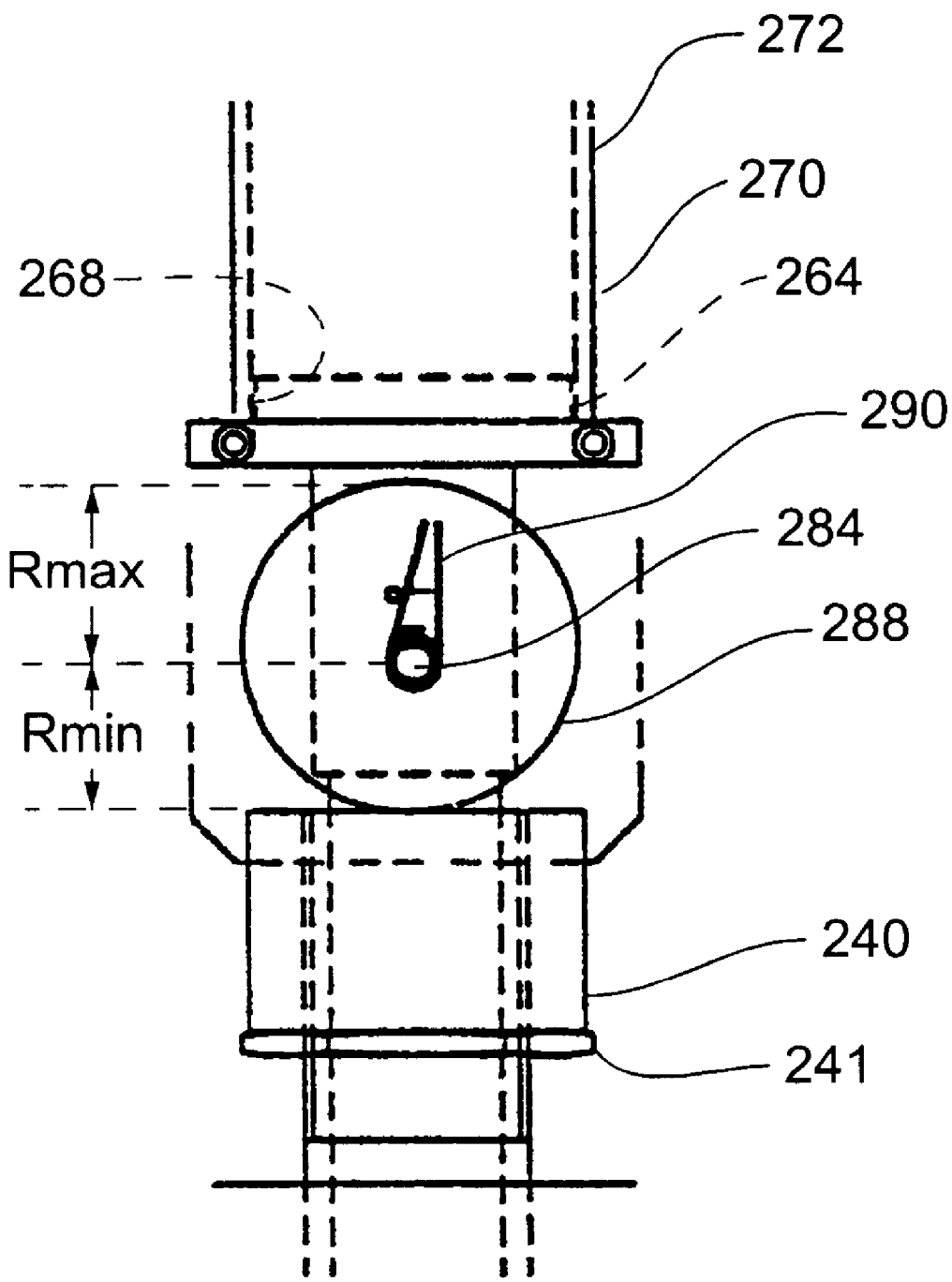
FIG. 10 is a fragmentary enlarged side elevation of an eccentric cam assembly included in the tension control apparatus shown in FIGS. 5, 6, 7 and 9.

Referring now to FIG. 9, a short spindle 280 is positioned in and extends through the hole 278. Spindle 280 has first and second ends 282 and 284, respectively, to which respective first and second eccentric cams 286 and 288 are keyed. A torsion spring 290 is positioned concentrically along the second end 284 of the spindle 280 between cam 288 and a first cover plate 300. See also FIG. 10. A reset lever 302 is positioned on the first end 284 of the spindle 280 adjacent a second cover plate 303, which is in turn positioned adjacent cam 288. Each cam 286 and 288 has a 4 mm eccentricity, which gives a rise of 8 mm which in turn corresponds to a total rope stretch of 16 mm. As discussed in detail with reference to FIG. 6 below, the reset lever 302 serves as a visual indicator of the extent to which tension on the rope assembly 180 has occurred during operation of the conveyor 130. Once the rope assembly 180 has stretched 16 mm, the tensioning assembly 140 must be reset. If the rope assembly 180 stretches more than 80mm, total repositioning of the rope assembly 180 relative to the head and tail pulley assemblies 168 and 170, respectively, is required. Although the tensioning assembly 140 is shown in use with eccentric cams, the tensioning assembly 140 may alternatively employ any suitable non-return device for adjusting tension.

The tensioning assembly 140 is used to maintain a preselected amount of tension on the rope assembly 180. The tube clamp 216 is locked to the inlet and outlet tubes 186 and 200, respectively, in a position where the clamp 216, and tubes 186 and 200 are reasonably secure relative to one another. Tension is then applied to the rope assembly 180 by tightening each nut 246 on its respective tensioning bolt 242, which causes the springs 248 positioned along the tensioning bolts 242 to contract. As the springs 248 contract, the force of the springs 248 on the upper plate 232 increases, which pulls the pressure plate 234 toward the upper plate 232. The push rod 250 moves upwardly in response, which in turn moves upper housing 142 and the tail pulley assembly 170 away from the head pulley assembly 168, thereby causing a increase in tension on the rope assembly 180.

Provided that the upper housing 142 is not experiencing excessive friction due to misalignment of the lower end 196 of tubular portion 192 relative to the flared upper end 190 of inlet tube 186, and misalignment of the lower end 210 of tubular portion 206 relative to the flared upper end 190 of inlet tube 200 (use of the dust cap seals 212 and 214 should ensure this), a known amount of tension may be applied to the rope assembly 180 by measuring the extent to which the springs 248 are compressed. Alternatively, tension may be applied using conventional empirical methods, and the length of the springs 248 subsequently measured for future reference.

Referring again to FIG. 6, after the correct amount of tension has been applied to the rope assembly 180, the reset lever 302 is rotated to a "set" position "$P_{SET}$", against the action of the torsion spring 190. The pressure collar 240 is then screwed up until it contacts each of the eccentric cam 286 and 288 at its minimum radius position "$R_{MIN}$". As the conveyor 130 operates, and the rope assembly 180 stretches, the springs 248 will continue to maintain the preselected tension on the rope assembly 180, and any upward movement of the push rod 250 will allow the cams 286 and 288 to rotate under the action of the torsion spring 290.

Because the cams 286 and 288 each have a low ramp angle, the cams 286 and 288 are each self-locking. Therefore, any additional tension applied to the rope assembly 180 caused by drive forces or unexpected snagging will not move the push rod 250 and allow the rope center to increase. However, any slack in the rope assembly 180 will be immediately taken up by the springs 248, and maintained by the action of the cams 286 and 288. As the rope assembly 180 stretches, each cam 286 and 288 rotates, which in turn causes the reset levers 300 and 302 to rotate, thereby serving as a visual indicator of the extent to which tension on the rope assembly 180 has decreased. Upon rotation of each cam 286 and 288 through 180 degrees, the respective reset levers 300 and 302 will likewise rotate 180 degrees to a "reset" position "PRESET". Movement of the reset lever 302 to the "reset" position "PRESET" indicates that each cam 286 and 288 is at its maximum radius "$R_{MAX}$", and can no longer compensate for any additional stretch in the rope assembly 180, and that the springs 248 have expanded to such an extent that an inadequate tensioning force is probably being exerted on the rope assembly 180.

To reset the tensioning assembly 140 so that the preselected tension originally applied to the rope assembly 180 is restored, each nut 246 is tightened on its respective tensioning bolt 242, which removes the force being exerted by the pressure collar 240 on the cams 286 and 288. The locking nut 241 is then slackened, and the reset lever 302 is then moved to the "set" position "$P_{SET}$" and held in place against the action of the torsion spring 290. The pressure collar 240 is then turned until it contacts the cams and 288 again. Locking nut 241 and nuts 246 are then tightened, thereby restoring the correct tension on the rope assembly 180 so that the conveyor 130 can resume operating.

In the embodiments described above, the tension control apparatus of the present invention is shown in use on a vertical aero mechanical conveyor which includes only head and tail pulley assemblies positioned within infeed and upper housings, respectively. However, the tension control apparatus of the present invention may be utilized in combination with an aeromechanical conveyor having conveyor tubes, additional pulleys and corresponding housings interconnected in any suitable arrangement, and including any suitable entry and exit points through which the particulate matter being conveyed may enter or exit the conveyor.

A tension control apparatus for use in an aero-mechanical conveyor is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. In a tension control apparatus for use in an aero-mechanical conveyor for moving bulk materials, the conveyor including upper and lower housings, head and tail pulley assemblies mounted on respective shafts positioned within the upper and lower housings, respectively, spaced-apart inflow and outflow conveyor tubes interconnecting the upper and lower housings, and an endless rope assembly disposed within the conveyor tubes and around the head and tail pulleys, the improvement comprising:

(a) a bracket cooperating with the inflow and outflow conveyor tubes;

(b) a guide sleeve carried by said bracket for receiving a push rod, said push rod extending along the length of the conveyor tubes from said guide sleeve to the upper housing and including an upper end engaging the head pulley assembly and a lower end extending through the guide sleeve; and (c) a tensioning assembly engaging the lower end of the push rod and carried by the bracket for urging the push rod against the head pulley assembly, thereby urging the head pulley assembly away from the tail pulley assembly and maintaining the rope assembly in a tensioned condition.

2. In a tension control assembly according to claim 1, wherein said bracket is carried on the inflow and outflow conveyor tubes.

3. In a tension control apparatus according to claim 2, wherein said tensioning assembly includes a spring carried thereon urging the tensioning assembly against the push rod for maintaining the rope assembly in the tensioned condition.

4. In a tension control apparatus according to claim 3, wherein said tensioning assembly further comprises:

(a) at least one upper plate connected to the bracket and guide sleeve;

(b) a lower plate engaging the lower end of the push rod; and (c) at least one bolt interconnecting the upper and lower plates and including a first end extending through said lower plate; and (d) a second end extending through said upper plate and having a complementary nut releasably attached thereto for being selectively tightened or loosened for urging the upper and lower plates toward or away from each other, thereby respectively increasing or decreasing the tensioned condition of the rope.

5. In a tension control apparatus according to claim 4, wherein said spring is concentrically positioned along the length of the bolt and captured between the upper plate and said nut, thereby permitting the spring to contract or expand in response to a respective increase or decrease in the tensioned condition of the rope.

6. In a tension control apparatus according to claim 1, wherein said tensioning apparatus comprises a cam carried on said push rod and in abutting engagement with a cam follower carried on the push rod, said cam positioned for rotation against said cam follower caused by upward movement of the cam follower in response to a decrease in the tensioned condition of the rope assembly, thereby maintaining the rope assembly in a preselected tensioned condition.

7. In a tension control apparatus according to claim 6, wherein said bracket is carried on the inflow and outflow conveyor tubes.

8. In a tension control apparatus according to claim 7, wherein said tensioning assembly includes a spring carried thereon urging the tensioning assembly against the push rod for maintaining the rope assembly in the tensioned condition.

9. In a tension control apparatus according to claim 8, wherein said tensioning assembly further comprises:

(a) at least one upper plate connected to the bracket and guide sleeve;

(b) a lower plate engaging the lower end of the push rod; and (c) at least one bolt interconnecting the upper and lower plates and including a first end extending through said. lower plate; and (d) a second end extending through said upper plate and having a complementary nut releasably attached thereto for being selectively tightened or loosened for urging the upper and lower plates toward or away from each other, thereby respectively increasing or decreasing the tensioned condition of the rope.

10. In a tension control apparatus according to claim 9, wherein said spring is concentrically positioned along the length of the bolt and captured between the upper plate and said nut, thereby permitting the spring to contract or expand in response to a respective increase or decrease in the tensioned condition of the rope.

11. In a tension control apparatus for use in an aero-mechanical conveyor for moving bulk materials, the conveyor including upper and lower housings, head and tail pulley assemblies mounted on respective shafts positioned within the upper and lower housings, respectively, spaced-apart inflow and outflow conveyor tubes interconnecting the upper and lower housings, and an endless rope assembly disposed within the conveyor tubes and around the head and tail pulleys, the improvement comprising:

(a) a bracket cooperating with the inflow and outflow conveyor tubes;

(b) a guide sleeve carried by said bracket for receiving a push rod, said push rod extending along the length of the conveyor tubes from said guide sleeve to the upper housing and including an upper end engaging the head pulley assembly and a lower end extending through the guide sleeve; and (c) a tensioning assembly engaging the push rod and carried by the bracket for urging the push rod against the head pulley assembly, thereby urging the head pulley assembly and the upper housing away from the tail pulley assembly and maintaining the rope assembly in a tensioned condition.

12. In a tension control apparatus according to claim 11, wherein said bracket is carried on the inflow and outflow conveyor tubes.

13. In a tension control apparatus according to claim 12, wherein said tensioning assembly includes a spring carried thereon urging the tensioning assembly against the push rod for maintaining the rope assembly in the tensioned condition.

14. In a tension control apparatus according to claim 13, wherein said tensioning assembly further comprises:

(a) at least one upper plate connected to the bracket and guide sleeve;

(b) a lower plate engaging the lower end of the push rod; and (c) at least one bolt interconnecting the upper and lower plates and including a first end extending through said lower plate; and (d) a second end extending through said upper plate and having a complementary nut releasably attached thereto for being selectively tightened or loosened for urging the upper and lower plates toward or away from each other, thereby respectively increasing or decreasing the tensioned condition of the rope.

15. In a tension control apparatus according to claim 12, wherein said spring is concentrically positioned along the length of the bolt and captured between the upper plate and said nut, thereby permitting the spring to contract or expand in response to a respective increase or decrease in the tensioned condition of the rope.

16. In a tension control apparatus according to claim 11, wherein said tensioning apparatus comprises a cam carried on said push rod in abutting engagement with a cam follower carried on the push rod, said cam positioned for rotation against said cam follower caused by upward movement of the cam follower in response to a decrease in the tensioned condition of the rope assembly, thereby maintaining the rope assembly in a preselected tensioned condition.

17. In a tension control apparatus according to claim 16, wherein said bracket is carried on the inflow and outflow conveyor tubes.

18. In a tension control apparatus according to claim 17, wherein said tensioning assembly includes a spring carried thereon urging the tensioning assembly against the push rod for maintaining the rope assembly in the tensioned condition.

19. In a tension control apparatus according to claim 18, wherein said tensioning assembly further comprises:

(a) at least one upper plate connected to the bracket and guide sleeve;

(b) a lower plate engaging the lower end of the push rod; and (c) at least one bolt interconnecting said upper and lower plates and including a first end extending through said lower plate; and (d) a second end extending through the upper plate and having a complementary nut releasably attached thereto for being selectively tightened or loosened for urging the upper and lower plates toward or away from each other, thereby respectively increasing or decreasing the tensioned condition of the rope.

20. In a tension control apparatus according to claim 19, wherein said spring is concentrically positioned along the length of the bolt and captured between the upper plate and the first nut, thereby permitting the spring to contract or expand in response to a respective increase or decrease in the tensioned condition of the rope.

21. In a method for maintaining a predetermined tension on an endless rope assembly of an aero-mechanical conveyor, the rope assembly disposed around head and tail pulleys mounted on respective shafts positioned within upper and lower housings and positioned within spaced-apart inflow and outflow conveyor tubes interconnecting the upper and lower housings, an improved method comprising the steps of:

(a) providing a bracket cooperating with the inflow and outflow conveyor tubes;

(b) providing a guide sleeve carried by said bracket for receiving a push rod, said push rod extending along the length of the conveyor tubes from said guide sleeve to the upper housing and including an upper end engaging the head pulley assembly and a lower end extending through the guide sleeve;

c) providing a tensioning assembly engaging the lower end of the push rod and carried by the bracket for urging the push rod against the head pulley assembly, thereby moving the head pulley assembly away from the tail pulley assembly and maintaining the rope assembly in the tensioned condition; and (d) positioning the head and tail pulley assemblies at a preselected fixed center distance relative to one another, thereby placing the rope assembly in the predetermined tensioned condition; and (e) adjusting the tensioning assembly within a range of adjustment to compensate for a decrease in the tensioned condition of the rope assembly, thereby maintaining said center distance and the tensioned condition as the tension control apparatus operates.

22. In a method for maintaining a predetermined tension on an endless rope assembly of an aero-mechanical conveyor according to claim 21, wherein said tensioning apparatus comprises a cam carried on said push rod and in abutting engagement with a cam follower carried on the push rod, said cam positioned for rotation against said cam follower caused by upward movement of the cam follower in response to a decrease in the tensioned condition of the rope assembly, thereby maintaining the rope assembly in a preselected tensioned condition.

* * * * *

UNITED STATES PATENT AND TRADEMARK OFFICE
CERTIFICATE OF CORRECTION

PATENT NO. : 6,439,377 B1
DATED : August 27, 2002
INVENTOR(S) : Peter J. Ellis and David Francis Hesketh It is certified that error appears in the above-identified patent and that said Letters Patent is hereby corrected as shown below:

<u>Column 14,</u>
Line 1, delete "claim 12" and insert -- claim 14 --.

Signed and Sealed this

Twenty-fifth Day of March, 2003

JAMES E. ROGAN
*Director of the United States Patent and Trademark Office*